US007818967B2

(12) United States Patent
Lehtinen

(10) Patent No.: US 7,818,967 B2
(45) Date of Patent: Oct. 26, 2010

(54) METHOD FOR CONTROLLING A CRANE ACTUATOR

(75) Inventor: Ari Lehtinen, Salo (FI)

(73) Assignee: Loglift Jonsered Oy AB, Salo (FI)

( * ) Notice: Subject to any disclaimer, the term of this patent is extended or adjusted under 35 U.S.C. 154(b) by 360 days.

(21) Appl. No.: 11/726,301

(22) Filed: Mar. 21, 2007

(65) Prior Publication Data

US 2007/0227346 A1 Oct. 4, 2007

(30) Foreign Application Priority Data

Mar. 31, 2006 (FI) ................................ 20065214

(51) Int. Cl.
*F16D 31/02* (2006.01)

(52) U.S. Cl. ........................................ 60/468; 91/31

(58) Field of Classification Search .................. 60/468; 91/31

See application file for complete search history.

(56) References Cited

U.S. PATENT DOCUMENTS

| | | | | | |
|---|---|---|---|---|---|
| 3,038,449 | A | * | 6/1962 | Murphy et al. | 91/31 |
| 4,327,549 | A | * | 5/1982 | Bianchetta et al. | 60/468 |
| 4,365,429 | A | * | 12/1982 | Ecker et al. | 60/468 |
| 4,815,614 | A | | 3/1989 | Putkonen et al. | |

FOREIGN PATENT DOCUMENTS

EP 0 632 789 B1 12/1999

* cited by examiner

*Primary Examiner*—F. Daniel Lopez
(74) *Attorney, Agent, or Firm*—Ladas & Parry LLP

(57) ABSTRACT

The invention relates to a method and an apparatus for controlling an actuator (7, 8) of a crane by control means (10) in a situation where the lifting power of the actuator (7, 8) of the crane is increased temporarily by an auxiliary valve arrangement (11). In the invention, control properties of the actuator (7, 8) are changed when the temporarily increased lifting power is applied to limit the speed of the actuator (7, 8).

17 Claims, 3 Drawing Sheets

METHOD FOR CONTROLLING A CRANE ACTUATOR

BACKGROUND OF THE INVENTION

Figure 1:
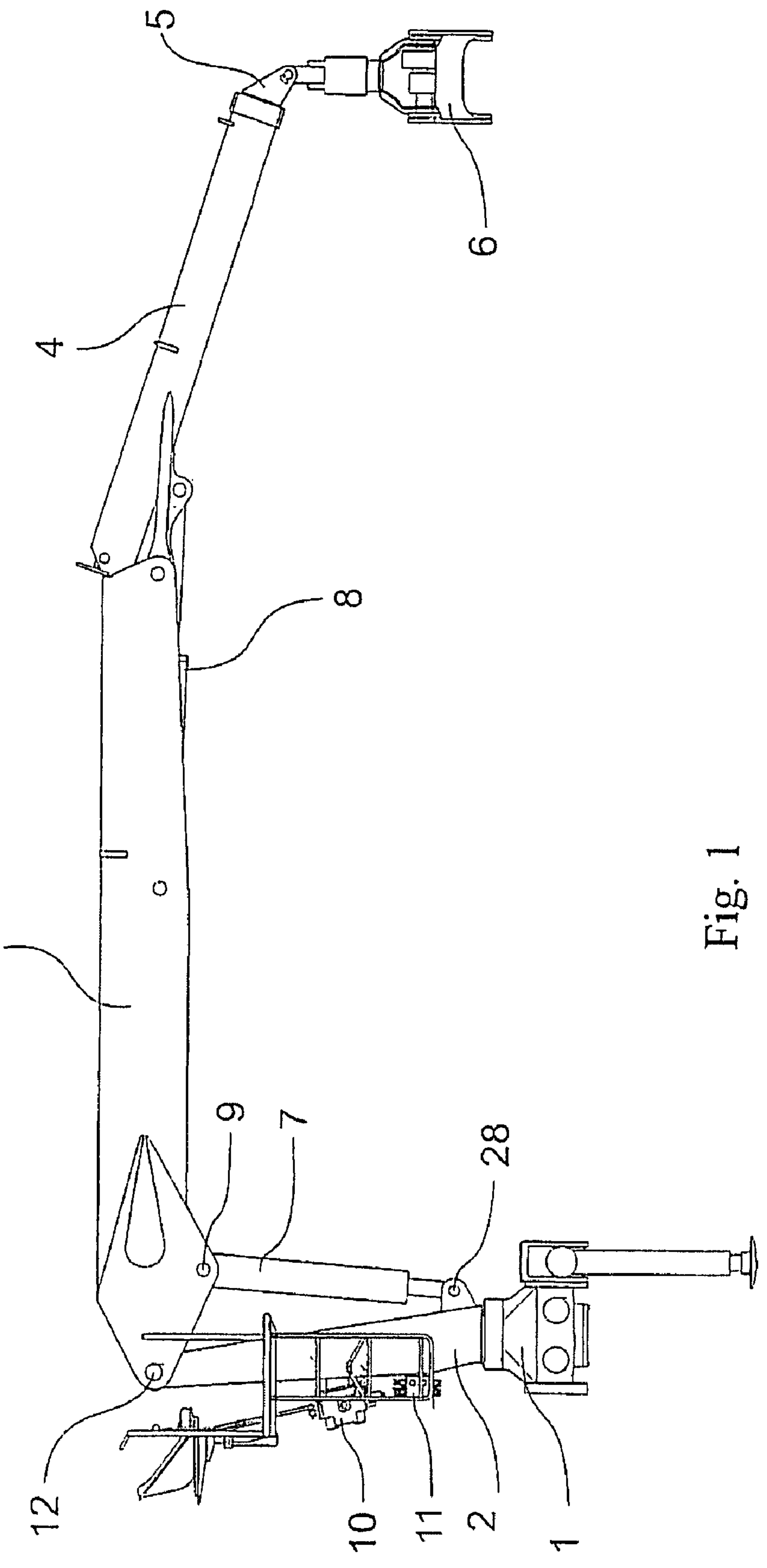

A method and apparatus for controlling an actuator of a crane by control means in a situation where the lifting power of the actuator of the crane is temporarily increased by means of an auxiliary valve arrangement.

Transport vehicles, for example log trucks and various lumbering machines, are equipped with loading cranes, the main purpose of which is to move, load or unload a load or perform other similar measures. A loading crane may also be utilized in other tasks essentially related to the work, where a heavy load is moved to improve working conditions or to reduce work-related expenses, an example of which is the avoidance of different road taxes dependent on the length of an articulated vehicle by lifting, for instance, a semi-trailer onto the cargo space of the vehicle body when there is no actual transportable load in the cargo spaces of the vehicle or its trailer. By lifting the semi-trailer onto the cargo space on top of the vehicle body, the length of the vehicle becomes essentially shorter and the road tax is lower when the vehicle is transported on a road. Depending on the weight of the semi-trailer, it is often necessary to temporarily increase the lifting power of the crane when the semi-trailer is lifted onto the vehicle body. Since the lifting power can be increased temporarily, it is thus possible to avoid the purchase of a crane having a higher lifting power and being thus heavier and more expensive in terms of both the purchase price and the operating costs only because the increased lifting power is required temporarily.

The design of loading crane constructions is based on standards, which define the calculation basis for the structures of mechanical parts according to the desired lifting power, load and work rotations, lifting class, load group and method of application, for instance. The calculation basis also includes dynamic coefficients. Dynamic coefficients define, for instance, lifting power and gravitational force effects of the crane parts and the load, i.e. the total load, and effects of total load acceleration or deceleration. The dynamic coefficient thus affects the lifting class of the crane, which, in turn, affects material selections and other cost factors associated with crane manufacture. The manufacture. The service life of the crane is affected by stress accumulations directed at the crane structures and formed during loading. The stress accumulation is in practice influenced by the static maximum stress level during the crane operation, which, in this case, is defined on the basis of the hydraulic operating pressure used in the crane, and by dynamic stress peaks occurring during the operation, which are due to accelerations or decelerations of the total load. The method and apparatus of the invention may affect the stress accumulation during load and work rotations in such a manner that the service life does not become essentially shorter, although the lifting power is temporarily increased. This property may be utilized during loading in situations where the normal lifting power of the crane is not sufficient for lifting a big load but there is a need for temporarily increasing the lifting power, whereupon the possibility to temporarily increase the lifting power of the crane without essentially shortening the service life of the crane allows to avoid the purchase of a bigger and thus more expensive and heavier crane.

In known solutions, to solve the above problem there is provided a method and a control apparatus, in which there is a separate actuator-specific pressure relief valve for increasing the lifting power in a pressure medium space on the operation side, i.e. on the piston side, of the lifting cylinder. A separate pressure relief valve is adjusted to an actuator-specific pressure level determined by normal pressures, i.e. normal lifting power. Likewise, said separate pressure relief valve is provided with a directional control valve, which may be controlled electrically to provide the actuator with a higher pressure level, if desired. The control apparatus of the crane also comprises the crane's actual control valve, the piston side of the lifting cylinder of which comprises an actuator-specific pressure relief valve, which is adjusted to the pressure level determined by the increased lifting power. By setting the separate directional control valve to an open position, the pressure level of the actuator-specific, separate pressure relief valve is determined as decisive, in this case as equivalent to the normal pressure level. By setting the separate directional control valve to a closed position, the actuator-specific pressure level is determined to have the pressure level determined by the actuator-specific pressure relief valve of the actual control valve, which in this case corresponds to the increased lifting power. In addition to the above arrangement, the hydraulic circuit of the crane is provided with a bypass flow control valve in a pressure line between a pump and the actual control valve in such a manner that an control valve in such a manner that an amount of the pump output preset in the bypass flow control valve may be guided electrically directly to a return line of the pressure medium. This arrangement aims at lowering the crane's speed of motion in cases where the crane is driven with the increased lifting power. The objective has been to reduce stress peaks caused by accelerations and decelerations of steering movements by lowering the crane's speed of motion. In addition to the above, the hydraulic circuit of the crane is provided, in the pressure line between the pump and the actual control valve, with a separate main-pressure relief valve, which helps to determine the maximum pressure level for the entire hydraulic circuit of the crane. The separate main-pressure relief valve is adjusted to a pressure level determined by normal pressures, i.e. the normal lifting power. In connection with the separate main-pressure relief valve there is also provided a directional control valve, which may be electrically controlled when the crane should be provided with a higher pressure level. In connection with the actual control valve of the control apparatus of the crane there is a main-pressure relief valve, which is adjusted to a pressure level determined by the increased lifting power. By setting the directional control valve in connection with the separate main-pressure relief valve to an open position, the pressure level of the separate main-pressure relief valve is determined as decisive, in this case as equivalent to the normal pressure level. By setting the directional control valve to a closed position, the pressure level of the crane is determined to have the pressure level determined by the main-pressure relief valve of the actual control valve, which in this case corresponds to the increased lifting power. Both above-mentioned directional control valves are controlled synchronously, whereby the pressure level determined by the separate, actuator-specific main-pressure relief valve and that determined by the separate main-pressure relief valve correspond to one another.

A problem with the above-mentioned implementation is that stress peaks of the structures due to accelerations or decelerations of the total load during the crane operation are particularly caused by pressure peaks occurring on the piston side of the lifting cylinder. The most significant factor in causing pressure peaks particularly during the lowering of the load is the design of the guide edges of the spindle of the actual control valve, particularly when it comes to the spindle part determining the control properties when the pressure medium is guided from the piston side of the lifting cylinder along the return line to the tank. In the above-mentioned implementation, the bypass flow control valve does not affect the pressure medium flowing from the piston side of the lifting cylinder to the return line, which means that it does not either affect the speed at which the load is lowered downwards or its deceleration or the stress peaks higher than normal pressure, which are due to the acceleration or deceleration caused by the increased pressure level and the corresponding load, whereby the service time of the crane also becomes shorter.

There are also systems, in which the increased lifting power is implemented by means of control electronics and sensors of the crane. Patent WO93l9000 discloses an implementation, in which the pressure of the operation side of a lifting cylinder is monitored by a pressure sensor. On the basis of signals of the pressure sensor and an angle sensor mounted in a boom arrangement, software controls the components of the crane hydraulic system according to a certain logic and provides an increased pressure level and reduced speeds of motion for the actuators of the crane, when the conditions defined in the software are fulfilled.

A problem with the above implementation is that the apparatus requires a lot of electronics, sensors and other equipment necessary for building an electronic apparatus. Consequently, the system is expensive in terms of both a purchase price and maintenance costs. An electronic implementation is also susceptible to faults when compared with a mechanical system, in which hydraulic components are controlled by simple electrotechnics.

BRIEF DESCRIPTION OF THE INVENTION

It is thus an object of the invention to provide a method and an apparatus implementing the method so that the above problems can be solved. The invention provides a method including changing control properties of an actuator when a temporarily increased lifting power is provided to limit the speed of the actuator. The invention also provides an apparatus for controlling an actuator of a cran. The apparatus includes an actuator-specific auxiliary valve arrangement and means for changing control properties of the actuator so as to limit the speed of the actuator.

The invention is based on the idea that during loading or an auxiliary function which is otherwise essentially associated with the operation and where a load exceeding the normal lifting power of the crane is lifted or moved, a temporarily higher lifting power may be arranged without shortening the service life of the crane. The highest stress peaks occur at that point of work rotation when the load is guided with the lifting cylinder of the crane downwards and the load is decelerated quickly. Because the operation of the hydraulic pressure relief valves is slow, the pressure in the actuator, in this case on the piston side of the lifting cylinder, rises temporarily high during the deceleration and thus causes a momentary stress peak in the structures of the crane.

The method and apparatus of the invention affect the stress accumulation in such a manner that the crane is provided with an auxiliary valve arrangement, by which the crane may be provided with a temporarily higher lifting power and the control properties of the crane may be changed when the higher lifting power is applied such that the excessive pressure rise in connection with changes in the speed of motion of the actuator and thus the occurrence of corresponding stress peaks may be prevented. Stress peaks are prevented when the crane is driven at the increased pressure level so that return oil from the operation space of the actuator or flowing from the actual control valve of the crane to the operation space of the actuator or other similar hydraulic fluid is choked by a choke or other similar flow control valve or means and a control valve in parallel with the choke in such a manner that the actuator-specific speed of the lifting cylinder is limited to a value which does not cause an excessive increase in the stress peaks caused by the acceleration or deceleration of the total load. In addition, the auxiliary valve arrangement is provided with pressure relief valves required for temporarily changing the main pressure level of the crane and the actuator-specific pressure level and control valves controlling the use of the pressure relief valves. In this context, a limited speed refers to a speed which is lower than the normal speed of the actuator when the normal lifting power of the crane is applied. An operation space of the actuator refers to the side carrying the load of the actuator, which may be, in the cylinder, either the piston side of the cylinder, the piston rod side of the cylinder or the load may even be reversible, which means that the operation space of the cylinder may change at different points of the actuator movement from one piston side to the other. Thus, the apparatus and method of the invention may be applied either on the piston side or on the piston rod side.

BRIEF DESCRIPTION OF THE INVENTION

Figure 2:
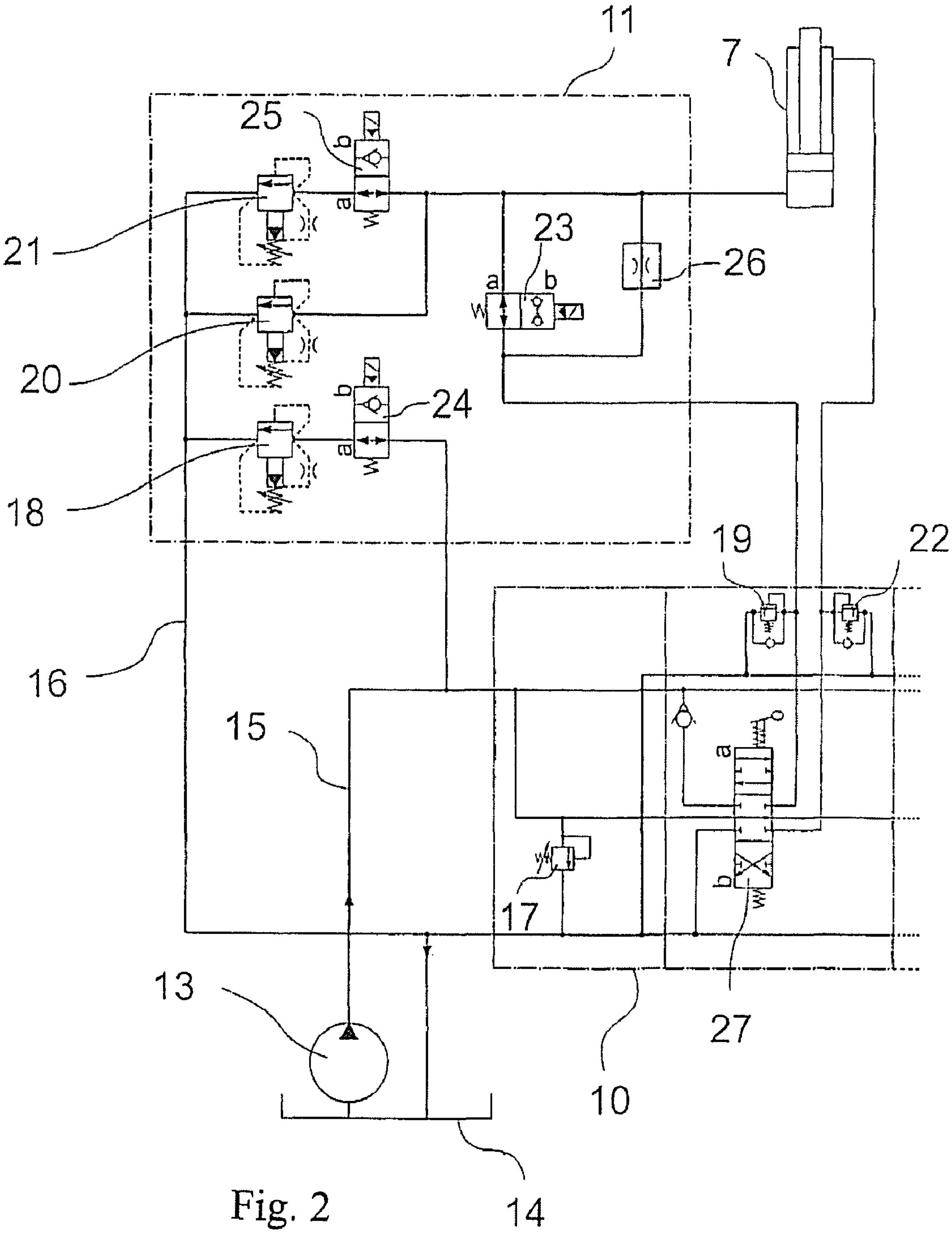
Figure 3:
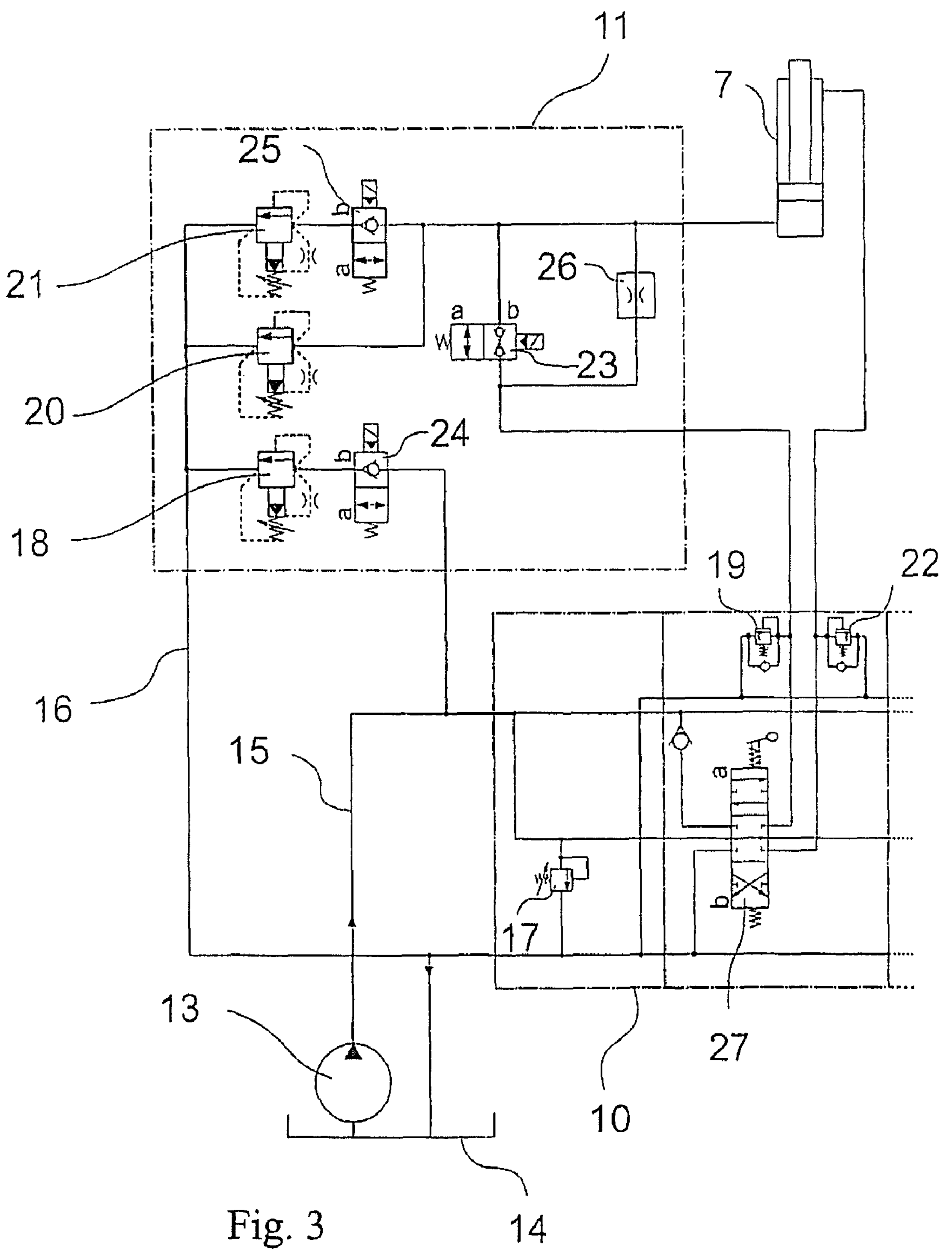

The invention will now be described in greater detail in association with the preferred embodiments and with reference to the attached drawings, in which FIG. 1 shows a prior art loading crane;

FIG. 2 shows a hydraulic chart of an apparatus of the invention. In the figure, directional control valves of an auxiliary valve arrangement of a hydraulic circuit are in the positions they have when the crane is driven at the normal pressure level; and FIG. 3 shows a hydraulic chart of an apparatus of the invention. In the figure, directional control valves of an auxiliary valve arrangement of a hydraulic circuit are in the positions they have when the crane is driven at an increased pressure level.

DETAILED DESCRIPTION OF THE INVENTION

FIG. 1 shows a prior art loading crane, the base of which is fixed to a vehicle or the like. A boom arrangement of the crane is mounted on the base 1 in such a manner that the boom arrangement of the crane helps to move, load or unload a load or to perform other similar measures. In this solution shown by way of example, the boom arrangement of the crane comprises a post 2 provided on the base 1 and mounted to be turned essentially around the vertical axis with respect to the base 1. A lifting boom 3, the movement of which with respect to the post 2 is controlled by a lifting cylinder 7, is in functional connection with the post 2. The lifting boom 3 is functionally connected to the post 2 by a joint 12 in such a manner that it can turn with respect to the post 2. The lower end of the lifting cylinder 7, by which the lifting boom 3 is moved with respect to the post 2, is articulated with the lower end of the post 2 by a joint 28, and the upper end of the lifting cylinder is articulated with the lifting boom 3, respectively, by a second joint 9. In turn, a transfer boom 4, whose movement with respect to the lifting boom 3 is controlled by a transfer cylinder 8, is functionally connected to the lifting boom 3. According to FIG. 1, the free end of the transfer boom 4 is equipped with an extension 5, to which a an extension 5, to which a clamshell bucket 6 is connected for grabbing the load. The crane boom arrangement 2, 3, 4, 5 and 6 is controlled by the cylinders 7 and 8 connected to control means 10 and by cylinders of the extension 5 and the clamshell bucket 6.

FIG. 2 schematically illustrates a hydraulic chart for the control of the crane boom arrangement, where control means 10 are provided for controlling the lifting cylinder 7 and other actuators of the crane. As to the control of actuators other than the lifting cylinder, the hydraulic chart is simplified. In this embodiment, the control means comprise a main-pressure relief valve 17, a directional control valve 27, which in this case controls the lifting cylinder 7, and actuator-specific pressure relief valves 19, 22, which together form the actual control valve of the crane. In addition, the control means comprise actuators, i.e. cylinders. In addition to these prior art control means, the apparatus according to the present invention comprises an auxiliary valve arrangement 11 arranged in the hydraulic circuit of the crane. The auxiliary valve arrangement 11 comprises a control valve 24 connected in parallel with a pressure medium space 15 between a pump 13 and the actual control valve 10 of the crane and used for determining whether a pressure relief valve 18 between control valve 24 and a return line 16 is in or out of use. Furthermore, a control valve 23 and a choke 26 in parallel with the control valve 23 are arranged between the actuator connection of the crane's actual control valve 10, guiding the pressure medium to the piston side of the lifting cylinder 7, and the connection on the piston side of the lifting cylinder 7. Furthermore, in parallel with the pressure medium space between the lifting cylinder 7 and the control valve 23 and the choke 26 there is a control valve 25, by which it is determined whether a pressure relief valve 21 between the control valve 25 and the return line 16 is in or out of use. Furthermore, a pressure relief valve 20 is arranged in the pressure medium space between the connection on the piston side of the lifting cylinder 7 and the above-mentioned control valve 25. In this example, all control valves 23, 24, 25 are controlled electrically. The pressure relief valves 17 and 18 of the above arrangement determine the main pressure level of the crane during loading. The pressure relief valves 19, 20, 21 determine the actuator-specific maximum pressure level, in this case that of the space on the piston side of the lifting cylinder 7, by protecting the actuator against external overload, for example.

The pressure levels of the pressure relief valves 17, 18, 19, 20, 21 are set in such a manner that the main-pressure relief valve 18 is set to correspond to the main pressure level according to the normal lifting power, whereas the main pressure level corresponding to the increased lifting power is set in the main-pressure relief valve 17. Likewise, the actuator-specific pressure relief valve 21 is set to correspond to the pressure level according to the normal lifting power, whereas the pressure relief valves 19 and 20 are set to the pressure level corresponding to the increased lifting power.

FIG. 2 shows a hydraulic chart in a form in which the crane is driven with the normal lifting power. When the crane is controlled with the normal lifting power, in this case at the normal pressure level, the control chart a of the control valve 24 is applied and the maximum pressure level of the pump pressure line 15 is defined according to the pressure level set in the pressure relief valve 18. When the lifting cylinder 7 is driven in the direction in which the total load is lifted, the pressure medium produced by the pump is guided via a directional control valve 27 of the actuator control means 10, where the position a is applied, to the piston side of the lifting cylinder 7 in such a manner that the pressure medium passes via both the control valve 23, where the control chart a is applied, and the choke 26 in parallel with it to the operational connection of the cylinder. The operational connection of the cylinder is protected by means of the actuator-specific pressure relief valve 21 in such a manner that the control chart a of the control valve 25 is applied. The actuator-specific maximum pressure level is thus defined according to the pressure level set in the actuator-specific pressure relief valve 21. When the lifting cylinder 7 is driven in the direction in which the total load is lowered, the pressure medium produced by the pump is guided via the directional control valve 27 of the actuator control means 10, where the position b is applied, to the piston rod side of the lifting cylinder 7, the actuator-specific pressure relief valve 22 of the operational connection of which limits the pressure of the operational connection to the preset pressure level. The return oil of the lifting cylinder 7 is guided from the piston side via both the tonal control valve 23, where the control chart a is applied, and the choke 26 in parallel with it to the actual control valve, where the pressure medium is guided by the directional control valve 27 further to an oil tank 14. When the total load is lowered, the lowering speed and the magnitude of pressure peaks caused by accelerations and decelerations depend on the directional control valve 27.

FIG. 3 shows a hydraulic chart when the crane is driven by using the method and apparatus of the invention in such a manner that the increased lifting power is applied. When the crane is controlled with the increased lifting power, in this case at the increased pressure level, the control chart b of the control valve 24 is applied and the pressure relief valve 18 is separated from the pressure line 15 of the pump in such a manner that the maximum pressure level of the pressure line is defined on the basis of the pressure level set in the main-pressure relief valve 17 in connection with the actual control valve 10. When the lifting cylinder 7 is driven in the direction in which the total load is lifted, the pressure medium produced by the pump is guided via the actuator-specific directional control valve 27 of the control means 10, where the position a is applied, to the piston side of the lifting cylinder 7 in such a manner that the pressure medium passes only through the choke 26 to the operational connection of the cylinder. The control chart b is applied in the control valve 23, whereby the pressure medium is prevented from passing through the control valve 23. In the choke 26, a pressure loss relative to a volume flow passing through the choke takes place, limiting the volume flow to the operational connection of the lifting cylinder 7, i.e. the speed of motion of the cylinder. The operational connection of the cylinder is protected at the raised pressure level primarily so that the actuator-specific pressure relief valve 19 of the control means 10, the purpose of which is to protect the pressure medium space between the actuator connection of the control means 10 and the choke 26, is set to a pressure level corresponding to the raised actuator-specific pressure level. In addition, the pressure relief valve 21 used with normal pressure is separated by closing the control valve 25 and applying the control chart b, whereby the pressure relief valve 20, the purpose of which is to protect the pressure medium space between the choke 26 and the piston side of the lifting cylinder 7, is set to a pressure level corresponding to the raised pressure level. When the lifting cylinder 7 is driven in the direction in which the total load is lowered, the pressure medium produced by the pump is guided via the directional control valve 27 of the control means 10, where the position b is applied, to the space on the piston rod side of the lifting cylinder 7, the actuator-specific pressure relief valve 22 of the operational connection of which limits the pressure of the operational connection to the preset pressure level. The return oil of the lifting cylinder 7 is guided from the piston side via the choke 26 to the control means 10, in which the pressure medium is guided by the directional control valve 27 further to the oil tank 14. The control valve 23 in parallel with the choke 26, in which valve the control chart b is applied, is closed at the increased pressure level, and all of the return oil is forced to pass through the choke 26, whereby in the choke 26 there is a pressure loss relative to the volume flow passing through the choke, which limits the volume flow of the return oil from the piston side of the lifting cylinder 7, i.e. the speed of motion of the cylinder. In addition, in the pressure medium space between the lifting cylinder 7 and the choke 26 there is a pressure relief valve 20, which is set to a pressure level corresponding to the increased pressure level and, in this example, to the same pressure level as the actuator-specific pressure relief valve 19 of the control means 10. In this example, when the total load is driven downwards, in addition to pressure caused by the total load on the piston side of the lifting cylinder 7 there may develop a pressure on the piston rod side of the lifting cylinder 7, which, in the area ratio of the cylinder, also increases the pressure on the piston side of the lifting cylinder 7. A combination of these pressures may increase the pressure of the pressure medium space between the piston side of the lifting cylinder and the choke considerably, and the pressure relief valve 20 is arranged in the same space to protect the actuator.

At the increased pressure level, particularly when the total load is lowered, the lowering speed and the magnitude of pressure peaks caused by accelerations and decelerations depend decisively on the properties of the choke 26 and the directional control valve 27, whereby the properties of the choke 26 are more determinant. When the choke 26 is dimensioned in a proper manner, the lifting and lowering speeds of the load may be adapted at the increased pressure level in such a manner that the pressure peaks caused by accelerations and decelerations do not become higher than at the normal pressure level, when the speed of motion of the lifting cylinder is higher.

The components included in the auxiliary valve arrangement 11 according to the present invention may also be distributed on different sides of the crane structure. Likewise, the method and apparatus of the above invention may also be applied to other crane movements, acceleration or deceleration of which causes similar stress peaks in the structures, such as to control of transfer cylinders or control of an actuator for any other crane movement. The speed reduction according to the invention may also be implemented by means of hydraulic flow control valves other than the choke. In other words, compared with applying the normal lifting power, the invention helps to lower the speed of the actuator when the increased lifting power is applied.

It is obvious to a person skilled in the art that as technology advances, the basic idea of the invention may be implemented in various ways. The invention and the embodiments thereof are thus not restricted to the above examples but may vary within the scope of the claims.

The invention claimed is:

1. A method for controlling an actuator of a crane including an auxiliary valve arrangement for temporarily increasing a lifting power of the actuator, the method comprising changing control properties of the actuator by limiting a speed of the actuator when the lifting power of the crane is being temporarily increased by the auxiliary valve arrangement, wherein the control properties of the actuator are changed by limiting the flow of a hydraulic fluid from an operation space and/or flowing from control means of the crane to the operation space of the actuator.

2. A method as claimed in claim 1, wherein the speed of the actuator is limited so as to not exceed a predefined maximum value.

3. A method as claimed in claim 1, wherein the step of changing control properties includes limiting a speed of the crane's lifting cylinder, a transfer cylinder, a cylinder of a boom arrangement extension, or a cylinder of a crane when the lifting power of the crane is being temporarily increased by the auxiliary valve arrangement.

4. A method as claimed in claim 1, wherein the control properties of the actuator are changed by means of a flow control valve.

5. A method as claimed in claim 4, wherein the control properties of the actuator are changed by means of a control valve arranged in parallel with the flow control valve.

6. A method as claimed in claim 4, wherein the flow control valve is a choke.

7. A method as claimed in claim 1, wherein the limited speed of the actuator when the lifting power of the crane is being temporarily increased by the auxiliary valve arrangement is lower than when the lifting power of the crane is not being temporarily increased.

8. An apparatus for controlling an actuator of a crane, the apparatus comprising control means for controlling the actuator of the crane and at least one actuator-specific auxiliary valve arrangement for temporarily increasing a lifting power of the crane, wherein the actuator-specific auxiliary valve arrangement comprises means for changing control properties of the actuator so as to limit a speed of the actuator when the lifting power of the crane is being temporarily increased by the auxiliary valve arrangement, wherein the means for changing the control properties of the actuator are arranged so as to limit a flow of a hydraulic fluid from an operation space and/or flowing from the control means of the crane to the operation space of the actuator.

9. An apparatus as claimed in claim 8, wherein the controllable actuator is a lifting cylinder, a transfer cylinder, a cylinder of a boom arrangement extension, or a cylinder of a crane tool.

10. An apparatus as claimed in claim 8, wherein the means for changing the control properties of the actuator comprise a flow control valve.

11. An apparatus as claimed in claim 10, wherein the flow control valve is a choke.

12. An apparatus as claimed in claim 10, wherein the means for changing the control properties of the actuator further comprises a control valve arranged in parallel with the flow control valve.

13. An apparatus as claimed in claim 8, wherein the means for changing the control properties of the actuator are arranged between a control valve and a piston side of the actuator.

14. An apparatus as claimed in claim 8, wherein the control means of the crane comprise a main-pressure relief valve, a directional control valve and one or more actuator-specific pressure relief valves.

15. An apparatus as claimed in claim 8, wherein the auxiliary valve arrangement comprises

- a first control valve connected to a first pressure medium space between a pump and the means for controlling the actuator of the crane,
- a first pressure relief valve between the first control valve and a return line of the means for controlling the actuator of the crane,
- a second control valve connected to a second pressure medium space between the actuator and the means for controlling the actuator,
- a second pressure relief valve between the second control valve and the return line of the means for controlling the actuator of the crane, and a third pressure relief valve arranged in the second pressure medium space between a piston side of the actuator and the second control valve.

16. An apparatus as claimed in claim 8, wherein the means for changing the actuator-specific control properties of the actuator is arranged so as to limit the speed of the actuator to a predefined maximum value.

17. An apparatus as claimed in claim 8, wherein the speed limited when the lifting power of the crane is being temporarily increased by the auxiliary valve arrangement is lower than when the lifting power of the crane is not being temporarily increased.

* * * * *